United States Patent
Schneider

(10) Patent No.: US 7,114,599 B2
(45) Date of Patent: Oct. 3, 2006

(54) PROTECTIVE SLEEVE

(75) Inventor: Eckhard Schneider, Birkenau (DE)

(73) Assignee: Carl Freudenberg KG, (DE)

( * ) Notice: Subject to any disclaimer, the term of this patent is extended or adjusted under 35 U.S.C. 154(b) by 43 days.

(21) Appl. No.: 11/054,604

(22) Filed: Feb. 9, 2005

(65) Prior Publication Data
US 2005/0206053 A1   Sep. 22, 2005

(30) Foreign Application Priority Data
Feb. 13, 2004 (DE) ............... 10 2004 007 441
Feb. 16, 2004 (DE) ............... 10 2004 007 735
Feb. 19, 2004 (DE) ............... 10 2004 008 421

(51) Int. Cl.
*F16D 55/18* (2006.01)

(52) U.S. Cl. ............... 188/72.4; 267/122; 277/636; 403/50

(58) Field of Classification Search ............... 188/72.4; 267/197, 64.19, 64.21, 64.23, 64.24, 64.27, 267/122, 129; 277/585, 634, 635, 636; 403/50
See application file for complete search history.

(56) References Cited

U.S. PATENT DOCUMENTS

| | | | |
|---|---|---|---|
| 3,041,885 A * | 7/1962 | Christiansen | 403/50 |
| 4,199,159 A * | 4/1980 | Evans | 277/636 |
| 4,327,925 A * | 5/1982 | Alexander et al. | 277/636 |
| 4,530,506 A * | 7/1985 | Weiler et al. | 277/636 |
| 5,219,052 A * | 6/1993 | Fanelli et al. | 188/364 |
| 5,443,141 A * | 8/1995 | Thiel et al. | 188/71.9 |
| 6,053,289 A * | 4/2000 | Bauer et al. | 188/71.9 |
| 6,361,028 B1 * | 3/2002 | Hubbell | 267/64.27 |
| 6,651,995 B1 * | 11/2003 | Buttner | 280/124.157 |
| 2004/0026194 A1 * | 2/2004 | Cortinovis | 188/218 A |

FOREIGN PATENT DOCUMENTS

EP   0448833   * 12/1990
GB   2020380   * 11/1979

* cited by examiner

*Primary Examiner*—Devon C. Kramer
(74) *Attorney, Agent, or Firm*—Harness, Dickey & Pierce, P.L.C.

(57) ABSTRACT

A protective sleeve made of an elastic material for a piston-cylinder unit with a piston disposed in a cylinder bore in an axially displaceable manner. The protective sleeve is provided with annular end segments that can be supported on the outer piston wall on one side and in the cylinder bore on the other. A middle segment of an essentially hollow cylindrical shape connects the two end segments with each other and, when the piston is in an entered position, is folded like a rag in a radial direction as in a bellows. To ensure reliable and correct folding of the protective sleeve during the entry of the piston, the middle segment is subdivided in the axial direction into annular longitudinal segments, the lengths of which are approximately equal to the length of a fold wall, and at least one of the longitudinal segments is provided with an essentially annular stiffening zone.

10 Claims, 6 Drawing Sheets

PROTECTIVE SLEEVE

CROSS-REFERENCE TO RELATED APPLICATIONS

This application claims the benefit of German Patent applications 10 2004 007 441.0, filed Feb. 13, 2004; 10 2004 007 735.5, filed Feb. 16, 2004; and 10 2004 008 421.1, filed Feb. 19, 2004. The disclosures of the above applications are incorporated herein by reference.

FIELD OF THE INVENTION

The present invention relates to a protective sleeve made of an elastic material for a piston-cylinder unit with a piston disposed in a cylinder bore in axially displaceable manner. The protective sleeve has annular end regions supported on an outer piston wall on one side and in the cylinder bore on the other. When the piston is in a pulled-out position a middle region of an essentially hollow cylindrical shape connects the two end regions to one another. When the piston is in an entered position, the middle region is folded like a rag in a radial direction as in a bellows.

DESCRIPTION OF THE RELATED ART

Protective sleeves of the afore-mentioned kind are used, for example, in disk brakes for motor vehicles. In a brake cylinder of a disk brake, it is in many cases necessary to provide, between the piston and the end of the cylinder bore, a protective sleeve for the purpose of preventing dirt from penetrating into the cylinder space. These known protective sleeves have the drawback, however, that, particularly when the space for installation is small and the stroke of the piston is long, the protective sleeve often does not fold properly during the entry of the piston. The reason for this is thought to be, among other things, that as the piston enters, individual folds bulge out in radial directions that hindering the further folding process. Because the part cannot be seen when it is installed, the flawed folding of the sleeve often goes unrecognized which results in possible damage to the protective sleeve.

In view of this drawback, the object of the invention is to further develop a protective sleeve so that, even when the space available for installation is small and the piston stroke is long, the protective sleeve, upon entry of the piston, can be returned into the folded position without any problems.

SUMMARY OF THE INVENTION

According to the invention, in a protective sleeve made of an elastic material for a piston-cylinder unit with a piston disposed in a cylinder bore in an axially displaceable manner, the protective sleeve has annular end regions that can be supported by the outer piston wall on one side and in the cylinder bore on the other. A middle region of an essentially hollow cylindrical shape connects the two end regions to one another and, in when the piston is in an entered position, is folded like a rag in a radial direction as in a bellows. The middle segment is subdivided in the axial direction into annular longitudinal segments, the lengths of which approximately equal the length of a fold wall. At least one of the longitudinal segments has an essentially annular stiffening zone. The annular stiffening zone can extend over the entire length of the longitudinal segment, namely in the axial direction of the piston, or it can extend only over part of the length thereof. In particular, embodiments are possible in which the configuration of the stiffening zone is in the form of a narrow stiffening ring.

The stiffening zone is preferably essentially annular. This means that it must extend around he periphery of the longitudinal segment in a manner such that radial stretching of the sleeve in this region is prevented. Preferably, the stiffening zone is positioned in a region that is especially exposed to the risk of bulging out during piston entry. The stiffening zone, however, does not necessarily have to be closed along the entire periphery. According to the present invention, during piston entry, the annular stiffening zone not only prevents radial bulging of the sleeve in the region at risk, but in addition, also serves as a guiding element on which the elastic longitudinal segments of the protective sleeve unroll or support themselves, which additionally facilitates the folding-in process.

Advantageously, in the stiffening zone the sleeve presents a stiffness that is by at least a factor of two higher than that of the elastic regions.

Increased stiffness can be achieved through a stiff shape or via a stiff material. Preferably, the protective sleeve consists of an elastomer. Other elastic materials, however, can also be used.

The stiffness can be increased, for example, by enveloping the longitudinal segment in question in the stiffening zone with a material of higher stiffness, or by entirely replacing the elastic material in this zone with a material of higher stiffness. Another alternative is to incorporate such a material of higher stiffness into the elastic material. The stiffening material, however, does not necessarily have to extend around the entire periphery of the stiffening zone and/or be firmly linked with the sleeve material.

The material may present interruptions at one or more sites, as for example a lock washer or a snap ring, and thus be slipped onto the protective sleeve only from the outside at a spot previously specified by bulges in the sleeve. Such an open ring can be made of any material with which the stiffness requirements for the particular use can be met.

In a preferred embodiment of the invention, the increased stiffness is achieved in simple fashion by increasing the wall thickness of the sleeve in this region. In another preferred embodiment of the invention, a stiffness ring is provided in a simple manner by enveloping the elastic material with a ring made of a stiffer material such as, for example, metal or a firm plastic. Another alternative invovles incorporating such a ring into the elastic material.

If the protective sleeve has several rag-like folds, it may be advantageous to provide several longitudinal segments with stiffening zones. The required number and the disposition of the longitudinal segments can be determined by the particular application for the protective sleeve.

In another advantageous embodiment of the invention, at least one of the end segments is in the shape of an annular end bulge that engages into a corresponding groove on the piston or in the cylinder bore. Preferably, the annular end bulge is located on the piston-side end of the protective sleeve.

In another preferred embodiment of the invention, the annular end bulge is connected with the sleeve wall by means of a film hinge formed by a local annular reduction in a bellows wall thickness. This measure, which can be applied even without stiffened longitudinal segments, also facilitates the proper folding or withdrawing of the protective sleeve.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

In the following, the invention is explained in greater detail by reference to the attached drawings, in which.

DETAILED DESCRIPTION OF THE PREFERRED EMBODIMENTS

The following description of the preferred embodiment(s) is merely exemplary in nature and is in no way intended to limit the invention, its application, or uses.

Figure 1:
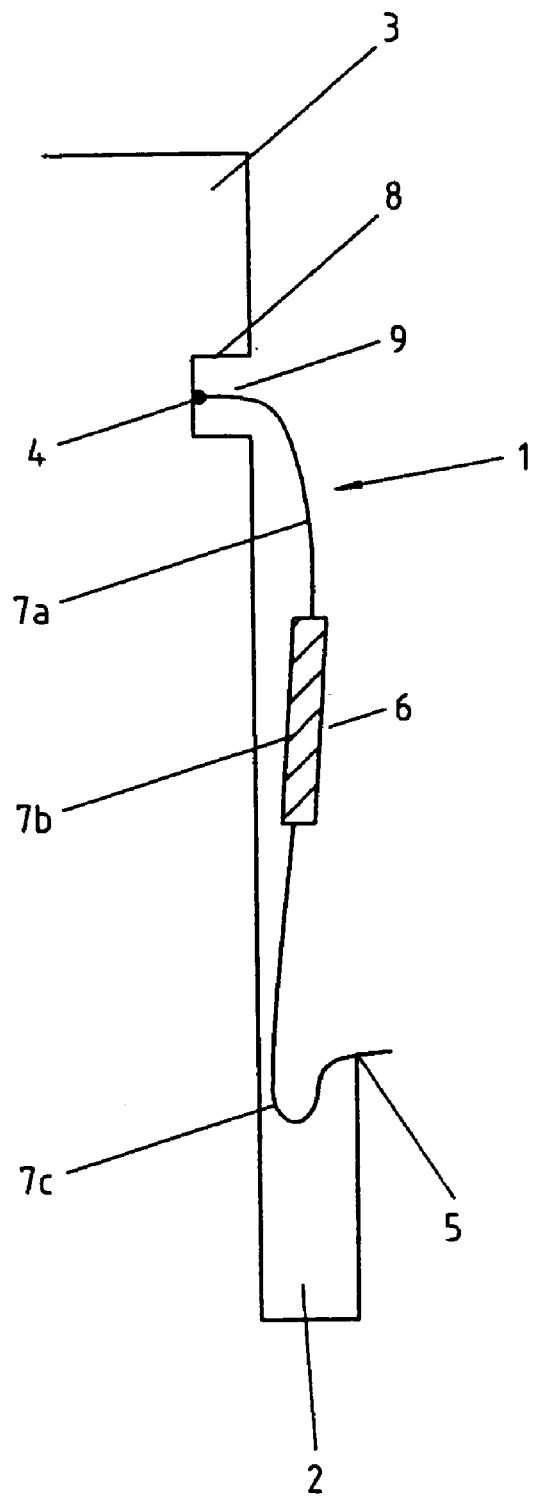
FIGS. 1 to 3 show in a schematic longitudinal cross-sectional representation for a piston-cylinder unit the folding process of a protective sleeve configured according to the invention.
Figure 3:
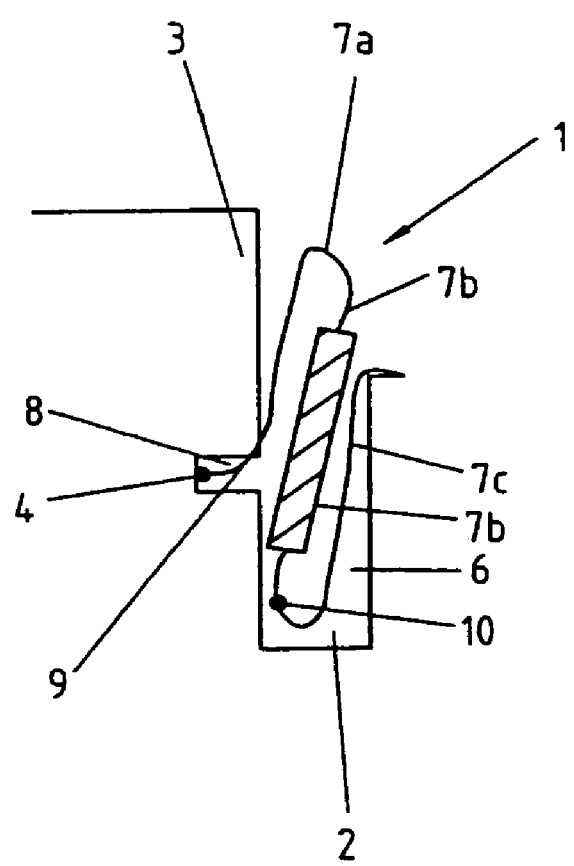

FIG. 1 depicts a protective sleeve 1 made of an elastic material for a piston-cylinder unit having a piston 3 disposed in a cylinder bore 2 in an axially displaceable manner. The protective sleeve 1 is provided with annular end segments 4 and 5 that can be supported on one side on the outer piston wall 3, and on the other side in the cylinder bore 2. The protective sleeve also has a middle segment 6 that is essentially a hollow cylindrical shape which connects the two end segments. When the piston 3 is in its entered position, as shown in FIG. 3, the middle segment 6 is folded like rag in a radial direction as in a bellows. By "of essentially hollow cylindrical shape" is meant here that the middle segment 6 can taper off or became wider in a conical fashion.

According to the invention, the middle segment 6 is subdivided in an axial direction into annular longitudinal segments 7a, 7b and 7c, the lengths of which approximately equal the length of a fold wall. The middle longitudinal segment 7b has a thicker wall than longitudinal segments 7a and 7c. Middle longitudinal segment 7b is thus stiffened relative to longitudinal segments 7a and 7c, and represents an annular stiffening zone in the sense of the invention.

According to a preferred embodiment, the end segment 4 is in the form of an annular bulge that engages into a corresponding groove 8 in the piston 3. According to another preferred embodiment, the annular bulge 4 is connected with the sleeve wall via a film hinge 9. The film hinge 9 is obtained by reducing the wall thickness in this region in an annular fashion (not shown in the schematic representation).

Figure 2:
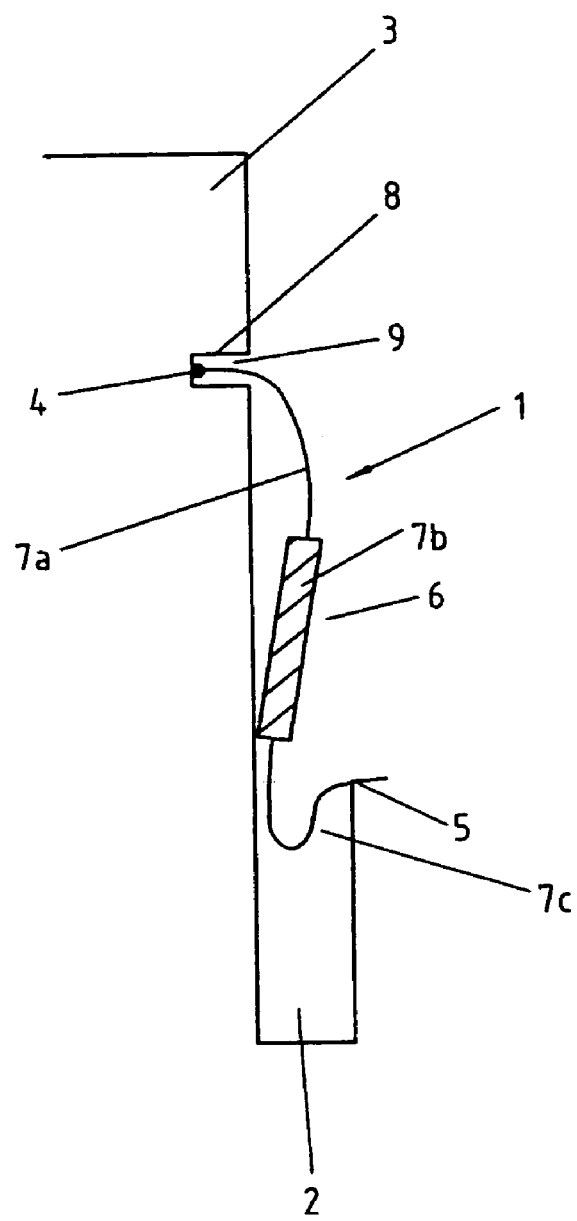

FIGS. 1 to 3 illustrate the folding process of a protective sleeve 1 configured according to the invention. FIG. 1 shows the protective sleeve 1 when the piston 3 is in a withdrawn position. As shown in FIG. 1, the protective sleeve 1 is almost entirely pulled out.

In FIG. 2, the piston 3 has already partly entered, and the protective sleeve 1 begins to fold again. As can be seen in FIG. 2, the sleeve 1 supports itself with its stiffened longitudinal segment 7b against the inner wall of the cylinder bore. This prevents the bulging of this longitudinal segment that usually leads to the folding problems known from the prior art. Furthermore, the stiffened longitudinal segment acts as a guiding element for the elastic longitudinal segments attached to it.

In FIG. 3, the piston has entered completely, and the protective sleeve 1 is properly folded.

Figure 4:
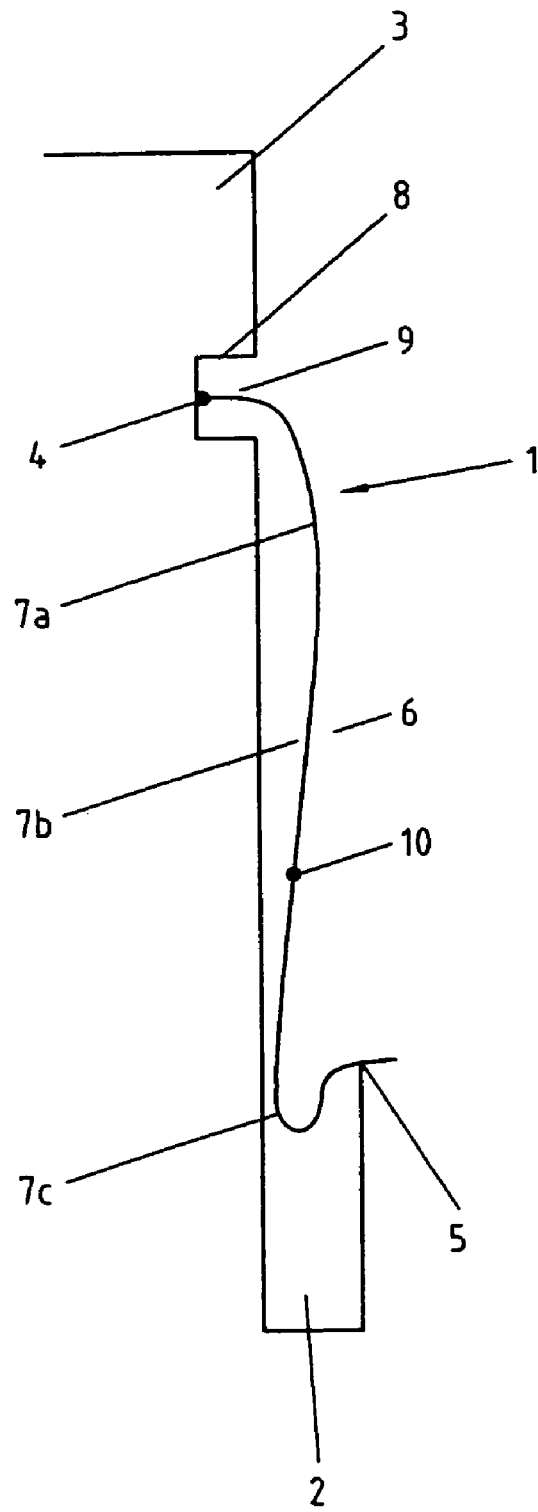
FIGS. 4 to 6 show in a schematic longitudinal cross-sectional representation the folding process according to FIGS. 1 to 3 for another preferred embodiment of a protective sleeve configured according to the invention.
Figure 5:
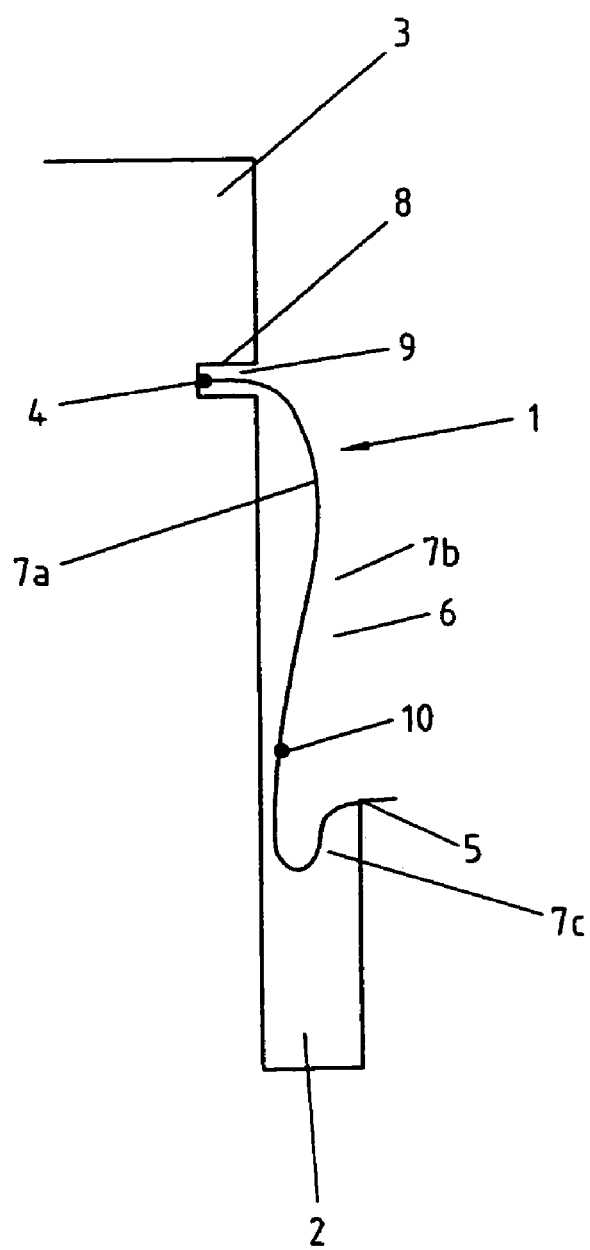
Figure 6:
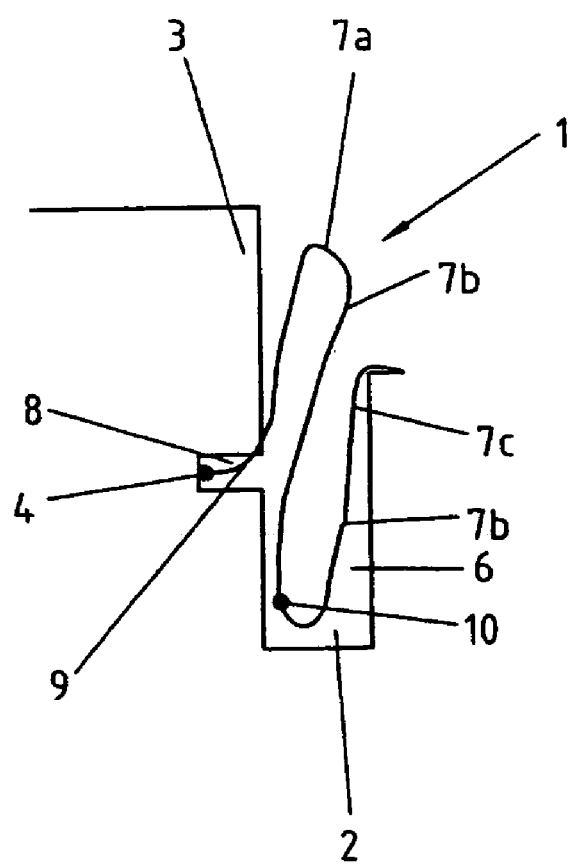

FIGS. 4 to 6, in a manner analogous to FIGS. 1 to 3, show the folding process for another preferred embodiment of a protective sleeve of the invention. The same reference numerals are used as for FIGS. 1 to 3. In the embodiment represented in FIGS. 4 to 6, the stiffening zone is formed by a stiffening ring 10 disposed at the end of longitudinal segment 7b on the side of the cylinder tube. In this embodiment, outside the stiffening ring 10, the longitudinal segment 7b consists of an elastic material. As can be been, in this embodiment, too, when the piston 3 enters, the protective sleeve folds in without any problems.

The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. A protective sleeve made of an elastic material for a piston-cylinder unit with a piston disposed in a cylinder bore in an axially displaceable manner, the protective sleeve comprising:

annular end segments supported at an outer piston wall on one side and in the cylinder bore on another side; and a middle segment of an essentially hollow cylindrical shape that connects the two end segments;

wherein when the piston is in an entered position, the middle segment is folded in a radial direction;

the middle segment is subdivided in an axial direction into annular longitudinal segments having lengths that are approximately equal to a length of a fold wall; and at least one of the longitudinal segments is provided with an essentially annular stiffening zone.

2. The protective sleeve according to claim 1, wherein in the stiffening zone a stiffness of the longitudinal segment is higher than a stiffness of the elastic material by at least a factor of two.

3. The protective sleeve according to claim 2, wherein the longitudinal segment including the stiffening zone has a wall thickness that is greater than a wall thickness of the other longitudinal sections.

4. The protective sleeve according to one of claim 1, wherein the stiffening zone is formed by a stiffening ring in the longitudinal segment.

5. The protective sleeve according to claim 4, wherein the stiffening ring is formed of a ring made of a material with a stiffness greater than a stiffness of the elastic material and is incorporated into the elastic material or bonded thereto.

6. The protective sleeve according to claim 4, wherein the stiffening ring is formed by a lock washer or snap ring which is clipped onto the protective sleeve.

7. The protective sleeve according to claim 6, wherein the protective sleeve is provided with annular bulges positioned at a distance from one another, the annular bulges serving to fix the lock washer or snap ring onto an outer periphery of the protective sleeve.

8. The protective sleeve according to claim 6, wherein the lock washeror the snap ring are made of a metal or of a plastic material with a stiffness greater than a stiffness of the elastic material.

9. The protective sleeve according to claim 1, wherein at least one of the end segments is in the form of an annular bulge.

10. The protective sleeve according to claim 9, wherein a connection between the annular bulge and the middle segment is in the form of a film hinge.

* * * * *